United States Patent
Szor

(10) Patent No.: US 7,392,543 B2
(45) Date of Patent: Jun. 24, 2008

(54) SIGNATURE EXTRACTION SYSTEM AND METHOD

(75) Inventor: Peter Szor, Northridge, CA (US)

(73) Assignee: Symantec Corporation, Cupertino, CA (US)

(*) Notice: Subject to any disclaimer, the term of this patent is extended or adjusted under 35 U.S.C. 154(b) by 977 days.

(21) Appl. No.: 10/611,472

(22) Filed: Jun. 30, 2003

(65) Prior Publication Data
US 2005/0022018 A1    Jan. 27, 2005

(51) Int. Cl.
*G06F 11/00* (2006.01)
(52) U.S. Cl. .............. 726/23; 726/22; 726/24; 726/25; 713/188
(58) Field of Classification Search .............. 726/26
See application file for complete search history.

(56) References Cited

U.S. PATENT DOCUMENTS

| | | | |
|---|---|---|---|
| 5,598,531 A * | 1/1997 | Hill .................... | 726/24 |
| 5,696,822 A | 12/1997 | Nachenberg ............ | 380/4 |
| 5,802,178 A * | 9/1998 | Holden et al. .......... | 713/151 |
| 5,822,517 A | 10/1998 | Dotan ................... | 395/186 |
| 6,301,699 B1 | 10/2001 | Hollander et al. ........ | 717/4 |
| 6,357,008 B1 | 3/2002 | Nachenberg ............ | 713/200 |
| 6,412,071 B1 * | 6/2002 | Hollander et al. ........ | 726/23 |
| 6,546,493 B1 * | 4/2003 | Magdych et al. ........ | 726/25 |
| 6,728,886 B1 * | 4/2004 | Ji et al. ................. | 726/24 |
| 7,058,821 B1 * | 6/2006 | Parekh et al. ........... | 713/194 |
| 7,080,408 B1 * | 7/2006 | Pak et al. ............... | 726/24 |
| 2003/0014662 A1 | 1/2003 | Gupta et al. | |
| 2003/0061514 A1 | 3/2003 | Bardsley et al. | |
| 2004/0064736 A1 * | 4/2004 | Obrecht et al. .......... | 713/201 |
| 2004/0250124 A1 * | 12/2004 | Chesla et al. ........... | 713/201 |

FOREIGN PATENT DOCUMENTS

EP    1 315 066    5/2003

OTHER PUBLICATIONS

Sung, A.H., et al, 'Static Analyzer of Vicious Executables (SAVE)', IEEE, ACSAC 2004, entire document, http://ieeexplore.ieee.org/iel5/9473/30059/01377239.pdf?arnumber=1377239.*
Szor, P., "*Attacks on WIN32*", Virus Bulletin Conference, Oct. 1998, Virus Bulletin Ltd., The Pentagon, Abingdon, Oxfordshire, England, pp. 57-84.
Szor, P., "*Memory Scanning Under Windows NT*", Virus Bulletin Conference, Sep. 1999, Virus Bulletin Ltd., The Pentagon, Abingdon, Oxfordshire, England, pp. 1-22.
Szor, P., "*Attacks on WIN32-Part II*", Virus Bulletin Conference, Sep. 2000, Virus Bulletin Ltd., The Pentagon, Abingdon, Oxfordshire, England, pp. 47-68.

(Continued)

*Primary Examiner*—Kristine Baum
*Assistant Examiner*—Ronald Baum
(74) *Attorney, Agent, or Firm*—Gunnison, McKay & Hodgson, L.L.P.; Serge J. Hodgson

(57) ABSTRACT

Host computer systems automatically detect malicious code. The host computer systems automatically generate and send malicious code packets of the malicious code to a local analysis center (LAC) computer system. Based on the received malicious code packets, the LAC computer system provides a signature update to a network intrusion detection system. Further, the LAC computer system also automatically sends malicious code signatures of the malicious code to a global analysis center. In this manner, the spread of the malicious code is rapidly detected and prevented.

31 Claims, 5 Drawing Sheets

OTHER PUBLICATIONS

Chien, E. and Szor, P., "*Blended Attacks Exploits, Vulnerabilities and Buffer-Overflow Techniques In Computer Viruses*", Virus Bulletin Conference, Sep. 2002, Virus Bulletin Ltd., The Pentagon, Abingdon, Oxfordshire, England, pp. 1-36.

Buysse, J., "*Virtual Memory: Window NT® Implementation*", pp. 1-15 [online]. Retrieved on Apr. 16, 2003. Retrieved from the Internet: <URL:http://people.msoe.edu/~barnicks/courses/cs384/papers19992000/buyssej-Term.pdf>.

Dabak, P., Borate, M. and Phadke, S., "*Hooking Windows NT System Services*", pp. 1-8 [online]. Retrieved on Apr. 16, 2003. Retrieved from the Internet:<URL:http://www.windowsitlibrary.com/Content/356/06/2.html>.

"*How Entercept Protects: System Call Interception*", pp. 1-2 [online]. Retrieved on Apr. 16, 2003. Retrieved from the Internet:<URL:http://www.entercept.com/products/technology/kernelmode.asp>. No author provided.

"*How Entercept Protects: System Call Interception*", p. 1 [online]. Retrieved on Apr. 16, 2003. Retrieved from the Internet:<URL:http://www.entercept.com/products/technology/interception.asp>. No author provided.

Kath, R., "*The Virtual-Memory Manager in Windows NT*", pp. 1-11 [online]. Retrieved on Apr. 16, 2003. Retrieved from the Internet:<URL:http://msdn.microsoft.com/library/en-us/dngenlib/html/msdn_ntvmm.asp?frame=true>.

Szor, P. and Kaspersky, E., "*The Evolution of 32-Bit Windows Viruses*", Windows & .NET Magazine, pp. 1-4 [online]. Retrieved on Apr. 16, 2003. Retrieved from the Internet:<URL:http://www.winnetmag.com/Articles/Print.cfm?ArticleID=8773>.

Szor, P., "*The New 32-bit Medusa*", Virus Bulletin, Dec. 2000, Virus Bulletin Ltd., The Pentagon, Abingdon, Oxfordshire, England, pp. 8-10.

Szor, P., "*Shelling Out*", Virus Bulletin, Feb. 1997, Virus Bulletin Ltd:, The Pentagon, Abingdon, Oxfordshire, England, pp. 6-7.

McCorkendale, B. and Szor, P., "*Code Red Buffer Overflow*", Virus Bulletin, Sep. 2001, Virus Bulletin Ltd., The Pentagon, Abingdon, Oxfordshire, England, pp. 4-5.

Nachenberg, C., "*A New Technique for Detecting Polymorphic Computer Viruses*", University of California, Los Angeles, 1995.

"*INFO: CreateFileMapping ( ) SEC_\* Flags*", pp. 1-2 [online]. Retrieved on Sep. 24, 2003. Retrieved from the Internet: <URL:http://support.Microsoft.com/default.aspx?scid=http://support.Microsoft.com:80/support/kb/articles/Q108/2/31.asp&NoWebContent=1> No author provided.

"*CreateFileMapping*", pp. 1-5 [online]. Retrieved on Sep. 10, 2003. Retrieved from the Internet:<URL:http://msdn.Microsoft.com/library/en-us/fileio/base/createfilemapping.asp?frame=true> No author provided.

Kephart et al., "Blueprint for a Computer Immune System" pp. 1-14 [Online], Oct. 1, 1997. Retrieved on Jul. 7, 1999 from the Internet: <URL:http://www.av.ibm.com/InsideTheLab/Bookshelf/ScientificPapers/Kephart/VB>. (XP002108500).

White et al., "Anatomy of a Commercial-Grade Immune System", pp. 1-28 [Online], Jun. 1999. Retrieved on Dec. 10, 2004 from the Internet: <URL:http://www.research.ibm.com/antivirus/SciPapers/White/Anatomy/Anatomy.PD>. (XP002310183).

Kephart, "A Biologically Inspired Immune System for Computers", *Proceedings of the International Workshop on the Synthesis and Simulation of Living Systems*, pp. 130-139, 1994. (XP001059743).

Symantec, "The Digital Immune System—Enterprise-Grade Anti-Virus Automation in the 21st Century", *Symantec Technical Brief*, pp. 1-14 [Online], 2001. Retrieved on Dec. 1, 2006 from the Internet: <URL:http://securityresponse.symantec.com/avcenter/reference/dis.tech.brief.pdf>. (XP002410639).

\* cited by examiner

SIGNATURE EXTRACTION SYSTEM AND METHOD

BACKGROUND OF THE INVENTION

1. Field of the Invention

The present invention relates to the protection of computer systems. More particularly, the present invention relates to a behavior-blocking system and method.

2. Description of the Related Art

Conventional immune systems such as the Digital Immune System (DIS) by IBM utilize antivirus scanners and heuristics to look for suspicious file content. Once suspicious file content is identified, client system users provide filebased submissions of suspicious file content to a global analysis center.

The global analysis center generates a malicious code signature based on the users' submissions. More particularly, the malicious code signature is based on replication of filebased computer viruses only, i.e., viruses that infect files. The malicious code signature is sent back to the client systems.

Since the conventional immune systems are based on replication of filebased computer viruses only, the conventional immune systems does not detect or protect against fileless malicious code, e.g., fileless worm code.

One type of network based intrusion detection system (IDS) such as Symantec ManHunt™ network intrusion detection system is capable of detecting fileless malicious code. This type of network based IDS uses a protocol analyzer module to detecting anomalies associated with the fileless malicious code based on knowledge of the known set of network protocols.

Unfortunately, a large set of attacks can be carried out successfully using protocols not yet known to the protocol analyzer module. Further, even if the anomalies and fileless malicious code are detected, the attack might be 100 percent successful at the time of detection. For example, the Win32/Slammer type worm is detected as UDP_FLOOD_ALERT based on high UDP traffic on the network, well after the attack has become successful.

Another type of network based intrusion detection system such as snort is also capable of detecting fileless malicious code. This type of network based IDS uses a network sniffer module, which looks for particular known signatures on the network. However, if there is no known signature for the fileless malicious code, the attack may be entirely undetected by this type of network based IDS. Thus, this type of network based IDS must be updated frequently to remain effective.

Unfortunately, the signature updates for the fileless malicious code are currently developed by security analysts after carefully analyzing samples of the fileless malicious code. This analysis of the fileless malicious code is relatively slow. Accordingly, it often takes hours or days until new signature updates are created by the security analysts and provided to the network based IDS. During this time, the fileless malicious code may be widespread.

SUMMARY OF THE INVENTION

In accordance with one embodiment, host computer systems automatically detect malicious code, which is infecting the host computer systems. Further, the host computer systems also automatically generate and send extracted malicious code packets of the malicious code to a local analysis center computer system. In one embodiment, the extracted malicious code packets include signatures of the malicious code.

If the local analysis center computer system determines that an attack is taking place, a signature update is provided to a network intrusion detection system. Further, the local analysis center computer system also automatically sends an extracted malicious code packet or malicious code signature of the malicious code undertaking the attack to a global analysis center. In this manner, the spread of the malicious code is rapidly detected and prevented.

Embodiments in accordance with the present invention are best understood by reference to the following detailed description when read in conjunction with the accompanying drawings.

DETAILED DESCRIPTION

Figure 1:
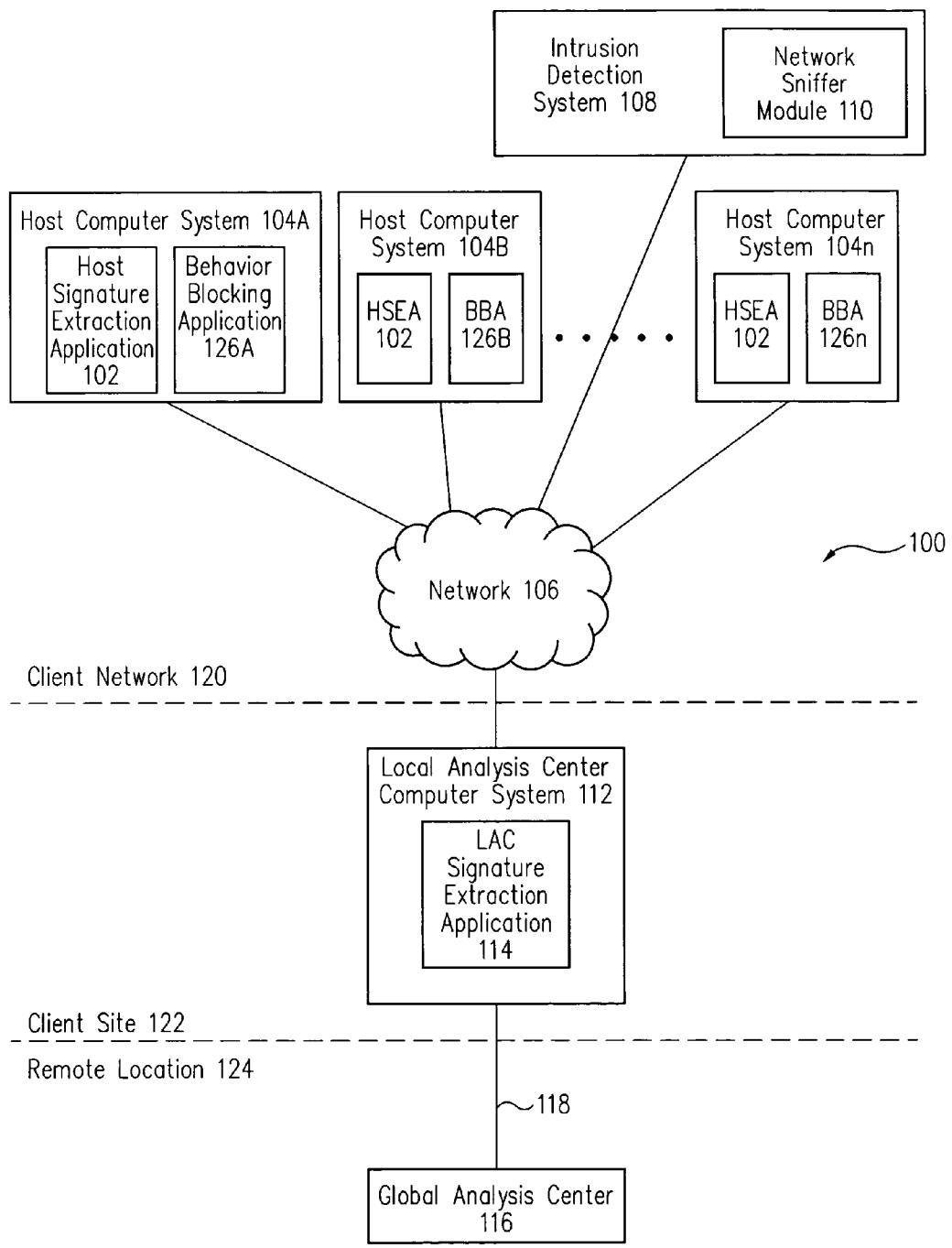
FIG. 1 is a diagram of a computer system that includes a host signature extraction application executing on a host computer system in accordance with one embodiment of the present invention.

In accordance with one embodiment, referring to FIG. 1, host computer systems 104 automatically detect malicious code, which is infecting host computer systems 104. Further, host computer systems 104 also automatically generate and send extracted malicious code packets of the malicious code to a local analysis center computer system 112. In one embodiment, the extracted malicious code packets include signatures of the malicious code.

Local analysis center computer system 112 determines whether an attack is taking place on client network 120 based upon the received extracted malicious code packets. If local analysis center computer system 112 determines that an attack is in fact taking place, local analysis center computer system 112 automatically creates a signature update including the malicious code signature of the malicious code undertaking the attack.

This signature update is automatically provided to an intrusion detection system 108, which uses the signature update to prevent the further spread of the malicious code on client network 120. Accordingly, the attack is defeated before the malicious code becomes widespread on client network 120.

Further, local analysis center computer system 112 also automatically sends an extracted malicious code packet or malicious code signature of the malicious code undertaking the attack to a global analysis center 116. Global analysis center 116 uses this information to prevent the further spread of the malicious code globally, for example, by delivering signature updates to global clients.

More particularly, FIG. 1 is a diagram of a computer system 100 that includes a host signature extraction application 102 executing on a host computer system 104A in accordance with one embodiment of the present invention. Host computer system 104A is coupled to a plurality of host computer systems 104B, . . . , 104n similar to host computer system 104A by a network 106. Network 106 can be any network or network system that is of interest to a user. Further, the particular type of and configuration of host computer systems 104A, 104B, . . . 104n, collectively host computer systems 104, are not essential to this embodiment of the present invention.

An intrusion detection system 108 is also coupled to network 106. Intrusion detection system 108 is a network based intrusion detection system that is capable of detecting fileless malicious code. Intrusion detection system 108 includes a network sniffer module 110, which looks for particular known signatures on network 106. Intrusion detection systems such as intrusion detection system 108 are well known to those of skill in the art, e.g., snort, and the particular intrusion detection system used is not essential to this embodiment of the present invention.

Also coupled to network 106 and thus to host computer systems 104 is a local analysis center (LAC) computer system 112, e.g., a second computer system, located at a local analysis center. A local analysis center (LAC) signature extraction application 114 is executing on LAC computer system 112.

LAC computer system 112 is also coupled to a global analysis center 116, e.g., over internet 118. Global analysis center 116 includes one or more global analysis center computer systems, sometimes called second computer systems, which are not illustrated for simplicity. Although not illustrated in FIG. 1, LAC computer system 112 is coupled to global analysis center 116 over network 106 in one embodiment.

In one embodiment, host computer systems 104, intrusion detection system 108 and network 106 are part of a client network 120. Further, client network 120 including LAC computer system 112 are located at a client site 122. Global analysis center 116 is located at a remote location 124 remote from client site 122.

Host computer system 104A also includes a behavior blocking application 126A. Behavior blocking application 126A detects attacks by malicious code, e.g., fileless malicious code, on host computer system 104A. In addition, in one embodiment, behavior blocking application 126A takes protective action to protect host computer system 104A from the malicious code. Behavior blocking application 126A works in conjunction with host signature extraction application 102 as discussed further below in reference to FIGS. 2 and 3.

In one embodiment, behavior blocking application 126A is a shell code blocking application as set forth in Szor, U.S. patent application Ser. No. 10/360,341, filed on Feb. 6, 2003, entitled "SHELL CODE BLOCKING SYSTEM AND METHOD", which is herein incorporated by reference in its entirety.

In another embodiment, behavior blocking application 126A is a send blocking application as set forth in Szor, U.S. patent application ser. No. 10/464,091 filed on Jun. 17, 2003, entitled "SEND BLOCKING SYSTEM AND METHOD", which is herein incorporated by reference in its entirety.

In one embodiment, host computer systems 104B, . . . , 104n include behavior blocking applications 126B, . . . , 126n, respectively. In one embodiment, behavior blocking applications 126A, 126B, . . . , 126n, collectively behavior blocking applications 126, are the same applications, e.g., are shell code blocking or send blocking applications or a combination thereof.

In another embodiment, one or more of behavior blocking applications 126 are different applications. For example, behavior blocking application 126A is a shell code blocking application and behavior blocking application 126B is a send blocking application.

Further, in one embodiment, one or more of host computer systems 104A, 104B, . . . , 104n does not include a host signature extraction application 102 and a behavior blocking application 126. For example, only host computer system 104A includes a host signature extraction application 102 and a behavior blocking application 126, i.e., behavior blocking application 126A.

Figure 2:
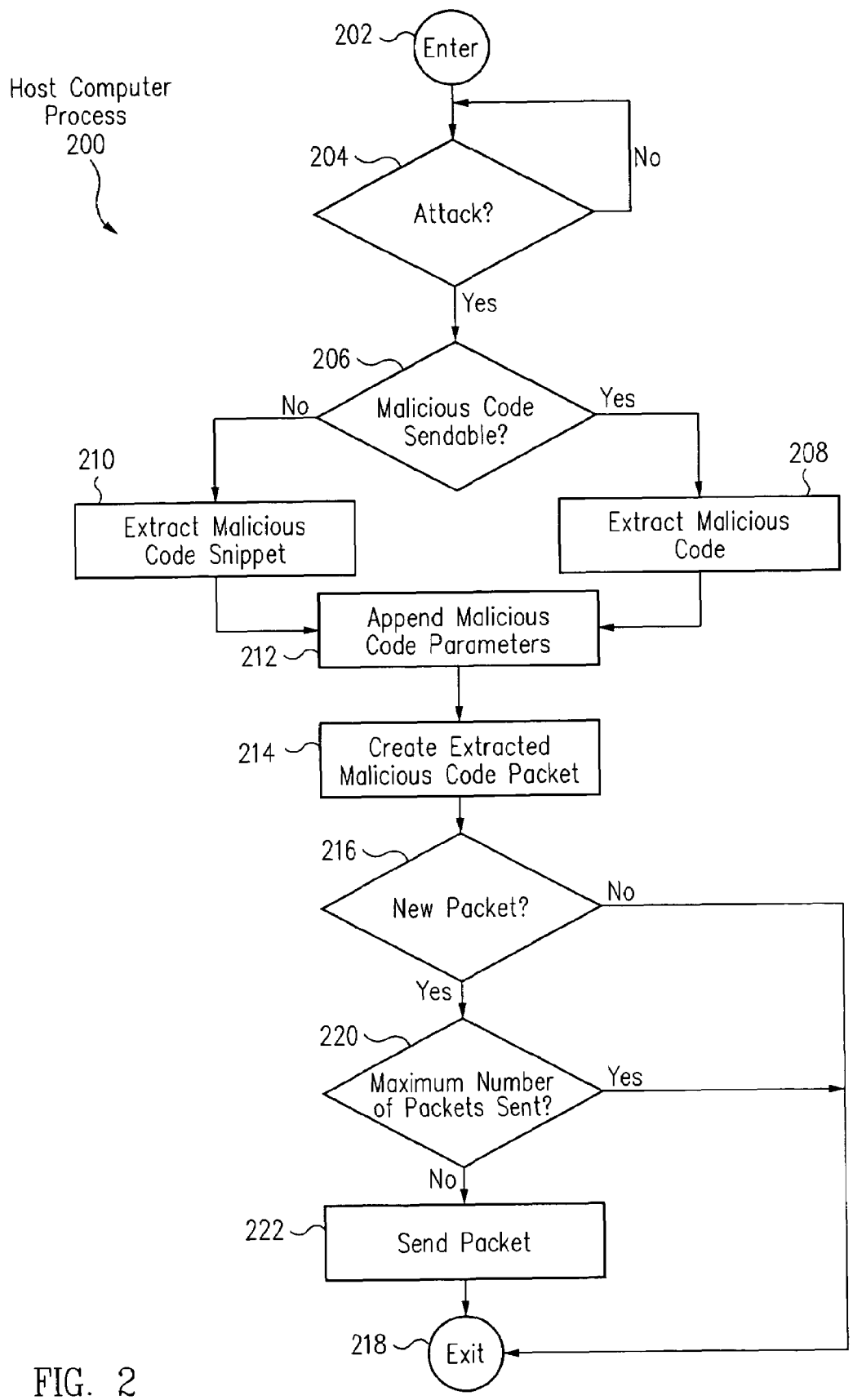
FIG. 2 is a flow diagram of a host computer process in accordance with one embodiment of the present invention.

FIG. 2 is a flow diagram of a host computer process 200 in accordance with one embodiment of the present invention. Execution of host signature extraction application 102 and behavior blocking application 126A on host computer system 104A results in the operations of host computer process 200 as described below in one embodiment. Although host computer process 200 is described in relation to host computer system 104A, in light of this disclosure, those of skill in the art will understand that host computer process 200 is equally applicable to one or more of host computer systems 104B, . . . , 104n.

Referring now to FIGS. 1 and 2 together, from an enter operation 202, flow moves to an attack check operation 204. In attack check operation 204, a determination is made as to whether a suspected or actual attack, a malicious exploit, use of common exploit tools such as an autorooter, hereinafter referred to as an attack for simplicity of discussion, has occurred on host computer system 104A. If an attack has not occurred on host computer system 104A, flow remains at attack check operation 204. Conversely, if an attack has occurred on host computer system 104A, flow moves to a malicious code sendable check operation 206.

In one embodiment, malicious code is defined as any computer program, module, set of modules, or code that enters a computer system without an authorized user's knowledge and/or without an authorized user's consent. Fileless malicious code is malicious code that is not file based but exists in memory only, e.g., in virtual memory only. More particularly, fileless malicious code is malicious code that appends itself to an active process in memory, sometimes called to a parent application.

In one embodiment, behavior blocking application 126A hooks critical operating system functions, e.g., send functions, of host computer system 104A and monitors calls to the hooked critical operating system functions. Calls by suspected or actual malicious code, hereinafter referred to as malicious code for simplicity of discussion, to the hooked critical operating system functions are detected and terminated and the location in memory of the malicious code is determined by behavior blocking application 126A.

For example, an attack or other exploit is detected and defeated by behavior blocking application 126A in attack check operation 204. Illustratively, behavior blocking application 126A is a send blocking application and malicious code, e.g., self replicating fileless malicious code such as a worm, located in a send buffer is attempting to send itself or a copy of itself to another of host computer systems 104. As another illustration, behavior blocking application 126A is a shell code blocking application and malicious code, e.g., fileless malicious shell code such as a worm, located in a data area of memory is attempting to open up a shell on host computer system 104A. Accordingly, flow moves from attack check operation 204 to malicious code sendable check operation 206.

In malicious code sendable check operation 206, a determination is made as to whether the malicious code associated with the attack of attack check operation 204 is, sendable. If a determination is made that the malicious code is sendable, flow moves from malicious code sendable check operation 206 to an extract malicious code operation 208. Conversely, if a determination is made that the malicious code is not sendable, flow moves from malicious code sendable check operation 206 to an extract malicious code snippet operation 210.

For example, if the size of the malicious code is 8 KB or less, the malicious code is sendable. Generally, the malicious code is sendable if sending of the malicious code on network 106 does not cause unacceptable congestion.

In one embodiment, the malicious code is shell code, e.g., is the code that opens up a new shell for the Linux.Slapper worm. As is well known to those of skill in the art, shell code is written in a very short and compact way and is therefore typically sendable. Accordingly, a determination is made in malicious code sendable check operation 206 that the malicious code is sendable and flow moves to extract malicious code operation 208.

In extract malicious code operation 208, the malicious code or a copy of the malicious code is extracted from the memory location. As discussed above, in one embodiment, behavior blocking application 126A provides the memory location, sometimes called the caller's address, of the malicious code, for example using a stack trace module. Accordingly, in one embodiment, the malicious code is copied or cut, sometimes called removed, from the memory location during extract malicious code operation 208. In one embodiment, the entire content, sometimes called raw data, of the entire memory location, e.g., buffer, is copied or cut and thus non-malicious code may be included with the malicious code. From extract malicious code operation 208, flow moves to an append malicious code parameters operation 212.

Conversely, returning to malicious code sendable check operation 206, if the size of the malicious code is greater than 8 KB, e.g., the buffer containing the malicious code is greater than 8 KB, the malicious code is not sendable in one embodiment. Generally, the malicious code is not sendable if sending of the malicious code on network 106 causes unacceptable congestion.

In one embodiment, the malicious code is relatively long and not sendable. Accordingly, a determination is made in malicious code sendable check operation 206 that the malicious code is not sendable and flow moves to extract malicious code snippet operation 210.

In extract malicious code snippet operation 210, a snippet, sometimes called portion, of the malicious code is extracted from the memory location. As discussed above, in one embodiment, behavior blocking application 126A provides the memory location, sometimes called the caller's address, of the malicious code. Accordingly, in one embodiment, a snippet (portion) of the malicious code is copied or cut, sometimes called removed, from the memory location during extract malicious code snippet operation 210. For example, a portion of the content of a buffer containing the malicious code is copied or cut.

To illustrate, in one embodiment, the caller's address is the memory location of the instruction or set of instructions that originated the critical operating system function call. A portion of the malicious code around, e.g. at addresses above and below, the caller's address is extracted in extract malicious code snippet operation 210. In one particular embodiment, +−4 KB of code around the caller's address is extracted although more or less than +−4 KB of code are extracted other embodiments. From extract malicious code snippet operation 210, flow moves to append malicious code parameters operation 212.

From either extract malicious code operation 208 or extract malicious code snippet operation 210, flow moves to append malicious code parameters operation 212. In append malicious code parameters operation 212, parameters associated with the malicious code are appended to either the malicious code extracted in extract malicious code operation 208 or to the malicious code snippet extracted in extract malicious code snippet operation 210.

For example, in one embodiment, parameters associated with the malicious code include the caller's address such as the location of the sendto( ) API of the malicious code, the name of the process in which the attack took place, the ports connected to this process, the send( ) API's connected ports such as UDP 1434, the service pack levels, the operating system information, and patch level information.

From append malicious code parameters operation 212, flow moves to a create extracted malicious code packet operation 214. In create extracted malicious code packet operation 214, an extracted malicious code packet is created. In one embodiment, an extracted malicious code packet is a collection of information which includes the malicious code parameters appended in append malicious code parameters operation 212 and either the extracted malicious code or the extracted malicious code snippet depending upon whether extract malicious code operation 208 or extract malicious code snippet operation 210, respectively, is performed.

Further, in create extracted malicious code packet operation 214, this collection of information is formatted as a network or other packet for transmission from host computer system 104A on to network 106. Protocols and formats for network packets are well known to those of skill in the art and depend, for example, on the particular type of network 106, and so create extracted malicious code packet operation 214 is not discussed further to avoid detracting from the principals of the invention.

From create extracted malicious code packet operation 214, flow moves to a new packet check operation 216. In new packet check operation 216, a determination is made as to whether the extracted malicious code packet created during create extracted malicious code packet operation 214 is new, i.e., is not a copy of a previous extracted malicious code packet previously created in create extracted malicious code packet operation 214.

If the extracted malicious code packet created during create extracted malicious code packet operation 214 is not new, flow moves to and exits at an exit operation 218 or returns to attack check operation 204. Conversely, if the extracted malicious code packet created during create extracted malicious code packet operation 214 is new, flow moves to a maximum number of packets sent check operation 220.

To illustrate, in one embodiment, the malicious code is repeatedly executed as a result of an endless execution loop through the malicious code. For example, in the case of the Slammer worm, the replication code calls sentto( ) API in an endless loop.

In accordance with this embodiment, on subsequent execution passes through the malicious code, a determination is made that the extracted malicious code packet created in create extracted malicious code packet operation 214 is not new, and flow moves to and exits at exit operation 218 or returns to attack check operation 204.

More particularly, on subsequent execution passes through the malicious code, a determination is made that the extracted malicious code packet created in create extracted malicious code packet operation 214 is exactly or essentially identical to the extracted malicious code packet previously created in create extracted malicious code packet operation 214 during the first execution pass through the malicious code. Accordingly, flow moves to and exits at exit operation 218 or returns to attack check operation 204.

Thus, if the extracted malicious code packet created in create extracted malicious code packet operation 214 is not new, no further action is taken. In this manner, flooding of network 106 and local analysis center computer system 112 with redundant information is prevented.

In one embodiment, the malicious code parameters appended in append malicious code parameters operation 212 match previous malicious code parameters of a previous extracted malicious code packet. Further, the malicious code or malicious code snippet extracted in extract malicious code operation 208 or extract malicious code snippet operation 210 matches a previously extracted malicious code or malicious code snippet of a previous extracted malicious code packet, respectively. In this event, a determination is made that the extracted malicious code packet created during create extracted malicious code packet operation 214 is not a new extracted malicious code packet in new packet check operation 216.

As another example, in one embodiment, if the malicious code parameters appended in append malicious code parameters operation 212 match previous malicious code parameters of a previous extracted malicious code packet, a determination is made that the extracted malicious code packet is not a new extracted malicious code packet in new packet check operation 216. The determination that the extracted malicious code packet is not a new extracted malicious code packet is made even if the malicious code or malicious code snippet extracted in extract malicious code operation 208 or extract malicious code snippet operation 210 does not match a previously extracted malicious code or malicious code snippet of a previous extracted malicious code packet, respectively.

In yet another embodiment, if the malicious code or malicious code snippet extracted in extract malicious code operation 208 or extract malicious code snippet operation 210 matches a previously extracted malicious code or malicious code snippet of a previous extracted malicious code packet, respectively, a determination is made that the extracted malicious code packet is not a new extracted malicious code packet in new packet check operation 216. The determination that the extracted malicious code packet is not a new extracted malicious code packet is made even if the malicious code parameters appended in append malicious code parameters operation 212 do not match previous malicious code parameters of a previous extracted malicious code packet.

However, returning to the above example, on the first execution pass through the malicious code, a determination is made that the extracted malicious code packet created in create extracted malicious code packet operation 214 is new, and flow moves to maximum number of packets sent check operation 220.

In one embodiment, if the malicious code parameters appended in append malicious code parameters operation 212 do not match previous malicious code parameters of a previous extracted malicious code packet, a determination is made that the extracted malicious code packet is a new extracted malicious code packet in new packet check operation 216.

In another embodiment, if the malicious code or malicious code snippet extracted in extract malicious code operation 208 or extract malicious code snippet operation 210 does not match a previously extracted malicious code or malicious code snippet of a previous extracted malicious code packet, respectively, a determination is made that the extracted malicious code packet is a new extracted malicious code packet in new packet check operation 216.

In yet another embodiment, if both the malicious code parameters and the malicious code/malicious code snippet do not match previous malicious code parameters and malicious code/malicious code snippets, respectively, a determination is made that the extracted malicious code packet is a new extracted malicious code packet in new packet check operation 216.

In one embodiment, a buffer and comparison function, e.g., a byte to byte comparison, are used to implement new packet check operation 216. However, other techniques are used in other embodiments and the particular technique used is not essential to the present invention.

Upon a determination that the extracted malicious code packet is new, flow moves to maximum number of packets sent check operation 220. In maximum number of packets sent check operation 220, a determination is made as to whether the maximum number of extracted malicious code packets have been sent from host computer system 104A. For example, the number of extracted malicious code packets that have been sent are maintained in a counter and this counter is compared to the maximum number.

If the maximum number of extracted malicious code packets have been sent from host computer system 104A, flow moves to and exits at exit operation 218 or returns to attack check operation 204. Conversely, if the maximum number of extracted malicious code packets have not been sent from host computer system 104A, flow moves to a send packet operation 222.

To illustrate, in one embodiment, the malicious code mutates each time the malicious code is executed in the endless loop. Accordingly, with this type of malicious code, a determination is made that the extracted malicious code packet is new in new packet check operation 216 each time the malicious code is executed. However, by limiting the maximum number of extracted malicious code packets allowed to be sent from host computer system 104A, flooding of network 106 and local analysis center computer system 112 with redundant information is prevented.

For example, the maximum number of extracted malicious code packets allowed to be sent from host computer system 104A is three per day although other maximum numbers are used in other embodiments.

Accordingly, if the maximum number of extracted malicious code packets have not been sent from host computer system 104A, flow moves to send packet operation 222. In send packet operation 222, the extracted malicious code packet created in create extracted malicious code packet operation 214 is sent from host computer system 104A.

In one embodiment, the extracted malicious code packet is sent via a secure channel, e.g., an encrypted/authenticated channel (SESA). By using an encrypted/authenticated channel, the extracted malicious code packet is not intercepted by intrusion detection system 108. Further, by using an encrypted/authenticated channel, the authenticity of the extracted malicious code packet received by local analysis center computer system 112 is assured.

In one embodiment, the extracted malicious code packet is sent to local analysis center computer system 112 as discussed further below in reference to FIG. 4. In another embodiment, the extracted malicious code packet is sent directly to global analysis center 116. In yet another embodiment, the extracted malicious code packet is sent to both local analysis center computer system 112 and global analysis center 116.

From send packet operation 222, flow moves to and exits at exit operation 218 or returns to attack check operation 204.

Figure 3:
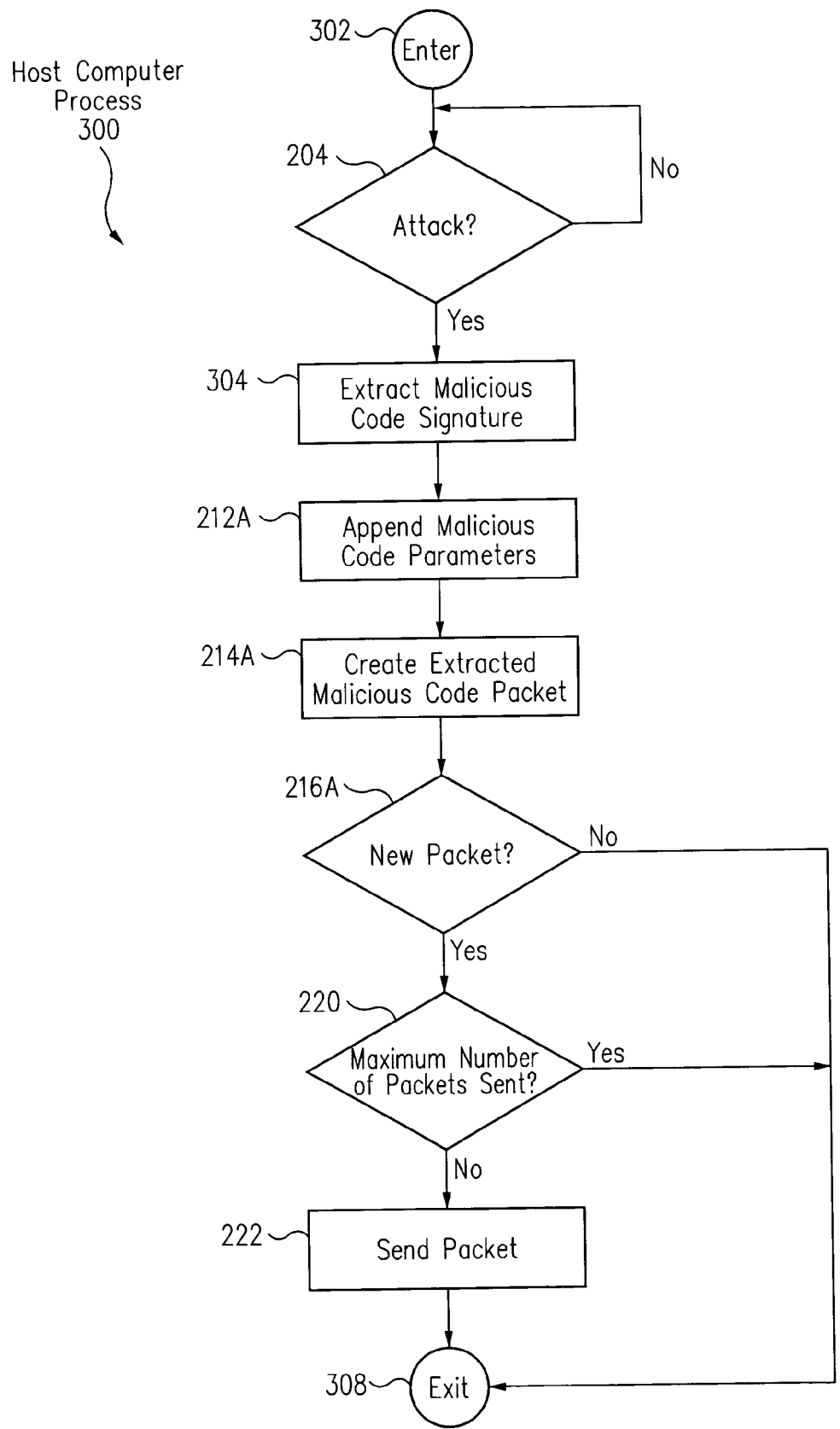
FIG. 3 is a flow diagram of a host computer process in accordance with another embodiment of the present invention.

FIG. 3 is a flow diagram of a host computer process 300 in accordance with one embodiment of the present invention. Execution of host signature extraction application 102 and behavior blocking application 126A on host computer system 104A results in the operations of host computer process 300 as described below in one embodiment. Although host computer process 300 is described in relation to host computer system 104A, in light of this disclosure, those of skill in the art will understand that host computer process 300 is equally applicable to one or more of host computer systems 104B, . . . , 104n.

Referring now to FIGS. 1, 2, and 3 together, from an enter operation 302, flow moves to attack check operation 204, which is performed as discussed above with reference to FIG. 2. In attack check operation 204, a determination is made as to whether a suspected or actual attack, a malicious exploit, use of common exploit tools such as an autorooter, hereinafter referred to as an attack for simplicity of discussion, has occurred on host computer system 104A. If an attack has not occurred on host computer system 104A, flow remains at attack check operation 204. Conversely, if an attack has occurred on host computer system 104A, flow moves to an extract malicious code signature operation 304.

In extract malicious code signature operation 304, the signature, sometimes called malicious code signature, of the malicious code is extracted. For example, a custom size signature from the malicious code is extracted using an extraction engine. In one embodiment, the malicious code signature is 32 bytes of the malicious code extracted backwards from the callers address. A signature is a specific sequence of information, e.g., bytes.

In one embodiment, the signature is extracted by processing the malicious code to extract critical malicious code information, for example, information unique to the malicious code, as those of skill in the art will understand in light of this disclosure.

As an example, the following is a replication code snippet, i.e., a malicious code snippet, of the slammer worm. The bold area is the automatically selected malicious code signature based on the location of the callers address:

| | | | | | | | |
|---|---|---|---|---|---|---|---|
| 00000142 | | | | | send_myself: | | |
| 00000142 | 8B | 45 | B4 | | mov | eax, [ebp–4Ch] | ; randomize! |
| 00000145 | 8D | 0C | 40 | | lea | ecx, [eax+eax*2] | |
| 00000148 | 8D | 14 | 88 | | lea | edx, [eax+ecx*4] | |
| 0000014B | C1 | E2 | 04 | | shl | edx, 4 | |
| 0000014E | 01 | C2 | | | add | edx, eax | |
| 00000150 | C1 | E2 | 08 | | shl | edx, 8 | |
| 00000153 | 29 | C2 | | | sub | edx, eax | |
| 00000155 | 8D | 04 | 90 | | lea | eax, [eax+edx*4] | |
| 00000158 | 01 | D8 | | | add | eax, ebx | |
| 0000015A | 89 | 45 | B4 | | mov | [ebp–4Ch], eax | |
| 0000015D | 6A | 10 | | | push | 16 | |
| 0000015F | 8D | 45 | B0 | | lea | eax, [ebp–50h] | |
| 00000162 | 50 | | | | push | eax | |
| 00000163 | 31 | C9 | | | xor | ecx, ecx | |
| 00000165 | 51 | | | | push | ecx ; =0 | |
| 00000166 | 66 | 81 | F1 | 78 01 | xor | cx, 376; this many bytes! | |
| 0000016B | 51 | | | | push | ecx | |
| 0000016C | 8D | 45 | 03 | | lea | eax, [ebp+3] | |
| 0000016F | 50 | | | | push | eax | |
| 00000170 | 8B | 45 | AC | | mov | eax, [ebp–54h] | |
| 00000173 | 50 | | | | push | eax | |
| 00000174 | FF | D6 | | | call | esi ; sendto( ) | |
| 00000176 | EB | CA | | | jmp | short send_myself ; ("CA") | |

Thus, in accordance with this example, the extracted malicious code signature is:
04 90 01 D8 89 45 B4 6A 10 8D 45 B0 50 31 C9 51
66 81 F1 78 01 51 8D 45 03 50 8B 45 AC 50 FF D6

Flow moves from extract malicious code signature operation 304 to an append malicious code parameters operation 212A. Append malicious code parameters operation 212A is similar to append malicious code parameters operation 212 of FIG. 2, the discussion of which is incorporated herein.

More particularly, in append malicious code parameters operation 212A, parameters associated with the malicious code are appended to the extracted malicious code signature extracted in extract malicious code signature operation 304.

From append malicious code parameters operation 212A, flow moves to a create extracted malicious code packet operation 214A. Create extracted malicious code packet operation 214A is similar to create extracted malicious code packet operation 214 of FIG. 2, the discussion of which is incorporated herein.

More particularly, in create extracted malicious code packet operation 214A, an extracted malicious code packet is created. In one embodiment, an extracted malicious code packet is a collection of information which includes the malicious code parameters appended in append malicious code parameters operation 212A and the extracted malicious code signature extracted in extract malicious code signature operation 304.

Further, in create extracted malicious code packet operation 214A, this collection of information is formatted as a network or other packet for transmission from host computer system 104A on to network 106. Protocols and formats for network packets are well known to those of skill in the art and depend, for example, on the particular type of network 106, and so create extracted malicious code packet operation 214A is not discussed further to avoid detracting from the principals of the invention.

From create extracted malicious code packet operation 214A, flow moves to a new packet check operation 216A. New packet check operation 216A is similar to new packet check operation 216 of FIG. 2, the discussion of which is incorporated herein.

More particularly, in new packet check operation 216A, a determination is made as to whether the extracted malicious code packet created during create extracted malicious code packet operation 214A is new, i.e., is not a copy of a previous extracted malicious code packet previously created in create extracted malicious code packet operation 214A.

If the extracted malicious code packet created during create extracted malicious code packet operation 214A is not new, flow moves to and exits at an exit operation 308 or returns to attack check operation 204. Conversely, if the extracted malicious code packet created during create extracted malicious code packet operation 214A is new, flow moves to a maximum number of packets sent check operation 220.

To illustrate, in one embodiment, the malicious code is repeatedly executed as a result of an endless execution loop through the malicious code. In accordance with this embodiment, on subsequent execution passes through the malicious code, a determination is made that the extracted malicious code packet created in create extracted malicious code packet operation 214A is not new, and flow moves to and exits at exit operation 308 or returns to attack check operation 204.

More particularly, on subsequent execution passes through the malicious code, a determination is made that the extracted malicious code packet created in create extracted malicious code packet operation 214A is exactly or essentially identical to the extracted malicious code packet previously created in create extracted malicious code packet operation 214A during the first execution pass through the malicious code. Accordingly, flow moves to and exits at exit operation 308 or returns to attack check operation 204.

Thus, if the extracted malicious code packet created in create extracted malicious code packet operation 214A is not new, no further action is taken. In this manner, flooding of network 106 and local analysis center computer system 112 with redundant information is prevented.

In one embodiment, the malicious code parameters appended in append malicious code parameters operation 212A match previous malicious code parameters of a previous extracted malicious code packet. Further, the malicious code signature extracted in extract malicious code signature operation 304 matches a previously extracted malicious code signature of a previous extracted malicious code packet. In this event, a determination is made that the extracted malicious code packet created during create extracted malicious code packet operation 214A is not a new extracted malicious code packet in new packet check operation 216A.

As another example, in one embodiment, if the malicious code parameters appended in append malicious code parameters operation 212A match previous malicious code parameters of a previous extracted malicious code packet, a determination is made that the extracted malicious code packet is not a new extracted malicious code packet in new packet check operation 216A. The determination that the extracted malicious code packet is not a new extracted malicious code packet is made even if the malicious code signature extracted in extract malicious code signature operation 304 does not match a previously extracted malicious code signature.

In yet another embodiment, if the malicious code signature extracted in extract malicious code signature operation 304 matches a previously extracted malicious code signature of a previous extracted malicious code packet, a determination is made that the extracted malicious code packet is not a new extracted malicious code packet in new packet check operation 216A. The determination that the extracted malicious code packet is not a new extracted malicious code packet is made even if the malicious code parameters appended in append malicious code parameters operation 212A do not match previous malicious code parameters of a previous extracted malicious code packet.

However, returning to the above example, on the first execution pass through the malicious code, a determination is made that the extracted malicious code packet created in create extracted malicious code packet operation 214A is new, and flow moves to maximum number of packets sent check operation 220.

In one embodiment, if the malicious code parameters appended in append malicious code parameters operation 212A do not match previous malicious code parameters of a previous extracted malicious code packet, a determination is made that the extracted malicious code packet is a new extracted malicious code packet in new packet check operation 216A.

In another embodiment, if the malicious code signature extracted in extract malicious code signature operation 304 does not match a previously extracted malicious code signature of a previous extracted malicious code packet, respectively, a determination is made that the extracted malicious code packet is a new extracted malicious code packet in new packet check operation 216A.

In yet another embodiment, if both the malicious code parameters and the malicious code signature do not match previous malicious code parameters and malicious code signatures, respectively, a determination is made that the extracted malicious code packet is a new extracted malicious code packet in new packet check operation 216A.

In one embodiment, a buffer and comparison function, e.g., a byte to byte comparison, are used to implement new packet check operation 216A. However, other techniques are used in other embodiments and the particular technique used is not essential to the present invention.

Upon a determination that the extracted malicious code packet is new, flow moves to maximum number of packets sent check operation 220, which is performed as discussed above in relation to FIG. 2. More particularly, if the maximum number of extracted malicious code packets have been sent from host computer system 104A, flow moves to and exits at exit operation 308 or returns to attack check operation 204. Conversely, if the maximum number of extracted malicious code packets have not been sent from host computer system 104A, flow moves to a send packet operation 222, which is performed as discussed above in relation to FIG. 2. From send packet operation 222, flow moves to and exits at exit operation 308 or returns to attack check operation 204.

Figure 4:
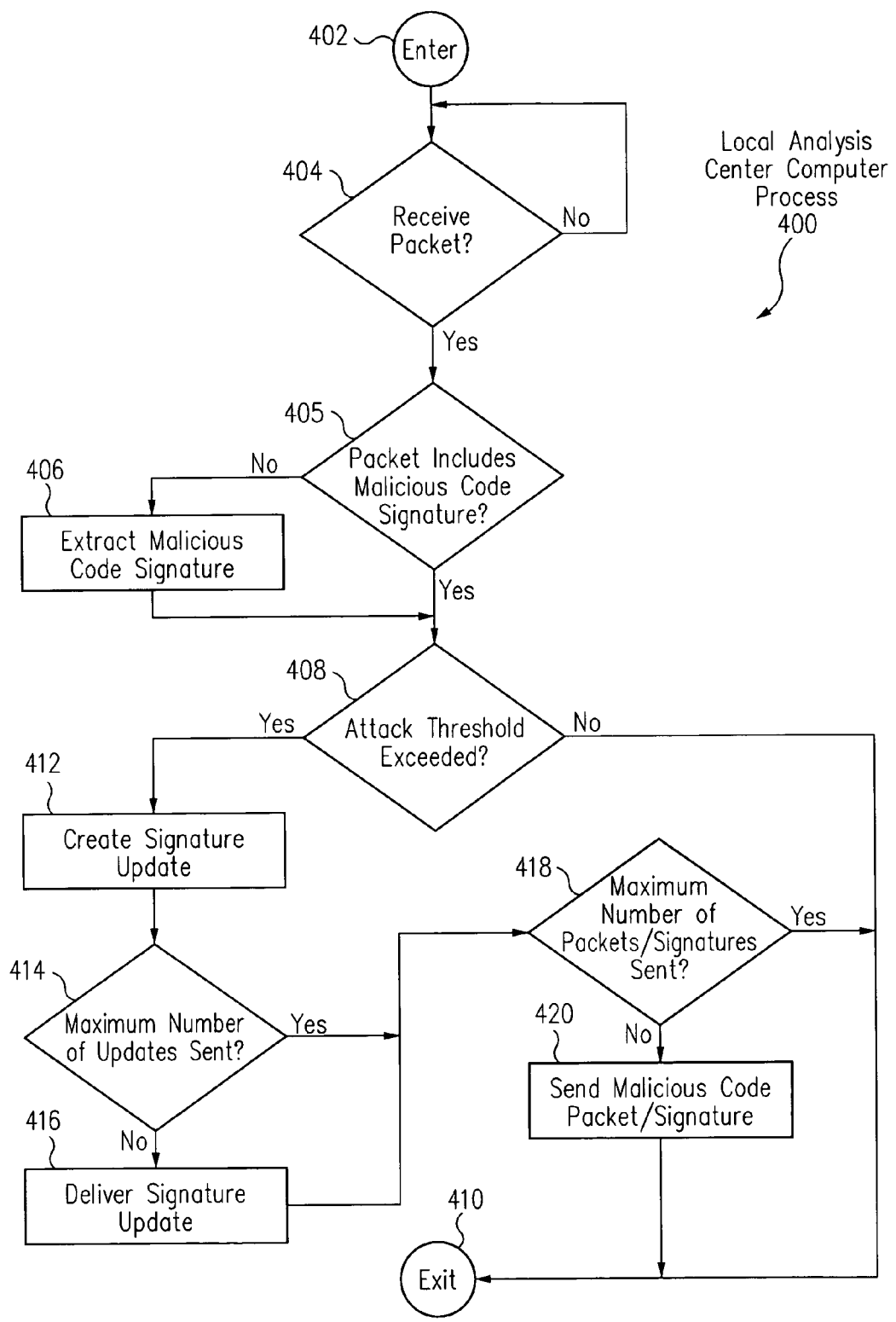
FIG. 4 is a flow diagram of a local analysis center computer process in accordance with one embodiment of the present invention.

FIG. 4 is a flow diagram of a local analysis center computer process 400 in accordance with one embodiment of the present invention. Execution of local analysis center signature extracted application 114 on local analysis center computer system 112 results in the operations of local analysis center computer process 400 as described below in one embodiment.

Referring now to FIGS. 1, 2, 3, and 4 together, from an enter operation 402, flow moves to a receive packet check operation 404. In receive packet check operation 404, a determination is made as to whether an extracted malicious code packet has been received by local analysis center computer system 112. As discussed above, an extracted malicious code packet is sent from host computer system 104A in send packet operation 222 of FIGS. 2 and 3 to local analysis center computer center 112.

If an extracted malicious code packet has not been received by local analysis center computer system 112, flow remains at receive packet check operation 404. However, upon receiving an extracted malicious code packet, flow moves from receive packet check operation 404 to a packet includes malicious code signature check operation 405, sometimes called check operation 405.

In check operation 405, a determination is made as to whether the extracted malicious code packet received in receive packet check operation 404 includes a malicious code signature, i.e., when the extracted malicious code packet was created in create extracted malicious code packet operation 214A of FIG. 3. If the extracted malicious code packet does not include a malicious code signature, flow moves to an extract malicious code signature operation 406. Conversely, if the extracted malicious code packet does include a malicious code signature, flow moves to an attack threshold exceeded check operation 408.

In extract malicious code signature operation 406, a malicious code signature is extracted from the extracted malicious code packet. The malicious code signature is extracted from the extracted malicious code packet in a manner similar to the extraction of the malicious code signature from the malicious code of operation 304 of FIG. 3, the discussion of which is herein incorporated by reference.

From extract malicious code signature operation 406, flow moves to attack threshold exceeded check operation 408.

In attack threshold exceeded check operation 408, a determination is made as to whether an attack threshold has been exceeded. An attack threshold is a minimum threshold of suspicious activity associated with the received extracted malicious code packets to results in a conclusion that an attack has occurred on client network 120.

In one embodiment, an attack threshold counter is incremented each time an extracted malicious code packet is received by local analysis center computer system 112. The attack threshold counter is incremented more or less depending upon the suspicion associate with the extracted malicious code packet.

For example, certain extracted malicious code packets are conclusive or nearly conclusive that an attack has in fact occurred and thus the attack threshold counter is substantially incremented. Thus, a single instance of these types of extracted malicious code packets may cause the attack threshold counter to be incremented above the attack threshold resulting in a determination that the attack threshold has been exceeded in attack threshold exceeded check operation 408.

As another example, other extracted malicious code packets are suspicious yet not conclusive that an attack has in fact occurred. Thus, a single instance of these types of extracted malicious code packets may not cause the attack threshold counter to be incremented above the attack threshold resulting in a determination that the attack threshold has not been exceeded in attack threshold exceeded check operation 408. However, a plurality of instances of these types of extracted malicious code packets may cause the attack threshold counter to be incremented above the attack threshold resulting in a determination that the attack threshold has been exceeded in attack threshold exceeded check operation 408.

If a determination is made that the attack threshold is not exceeded in attack threshold exceeded check operation 408, flow moves to and exits at exit operation 410 or returns to check operation 404.

In contrast, if a determination is made that the attack threshold is exceeded in attack threshold exceeded check operation 408, flow moves to a create signature update operation 412. In create signature update operation 412, a signature update for intrusion detection system 108 is created. For example, a definition file for use by intrusion detection system 108 is updated with the malicious code signature extracted during extract malicious code signature operation 406 or received with the extracted malicious code packet during check operation 404. Updating and use of definition files by intrusion detection systems are well known to those of skill in the art and so is not discussed further to avoid detracting from the principals of the present invention.

From create signature update operation 412, flow moves to a maximum number of updates sent check operation 414. In maximum number of updates sent check operation 414, a determination is made as to whether the maximum number of signature updates have been sent from local analysis center computer system 112 to intrusion detection system 108. For example, the number of signature updates that have been sent are maintained in a counter and this counter is compared to the maximum number.

If the maximum number of signature updates have been sent from local analysis center computer system 112, flow moves to a maximum number of packets/signatures sent check operation 418. Conversely, if the maximum number of signature updates have not been sent from local analysis center computer system 112, flow moves to a deliver signature update operation 416.

By limiting the maximum number of signature updates allowed to be sent from local analysis center computer system 112, flooding of intrusion detection system 108 with signature updates is prevented.

For example, the maximum number of signature updates allowed to be sent from local analysis center computer system 112 is 3 per day although other maximum numbers are used in other embodiments.

Accordingly, if the maximum number of signature updates have not been sent from local analysis center computer system 112, flow moves to deliver signature update operation 416. In deliver signature update operation 416, the signature update created in create signature update operation 412 is sent from local analysis center computer system 112. In one embodiment, the signature update is sent to intrusion detection system 108. In another embodiment, the signature update is sent directly to global analysis center 116. In yet another embodiment, the signature update is sent to both intrusion detection system 108 and global analysis center 116.

From deliver signature update operation 416, flow moves to maximum number of packets/signatures sent check operation 418.

Accordingly, as discussed above, host computer systems 104 automatically detect malicious code, which is infecting host computer systems 104. Further, host computer systems 104 also automatically generate and send extracted malicious code packets from the runtime systems to local analysis center computer system 112.

Local analysis center computer system 112 determines whether an attack is taking place on client network 120 based upon the received extracted malicious code packets. If local analysis center computer system 112 determines that an attack is in fact taking place, local analysis center computer system 112 automatically creates a signature update including the malicious code signature of the malicious code undertaking the attack.

This signature update is automatically provided to intrusion detection system 108, which uses the signature update to prevent the further spread of the malicious code on client network 120. In accordance with one embodiment, the signature update is automatically provided, e.g., without human intervention and the associated time delay, to intrusion detection system 108 immediately upon detecting an attack on client network 120. Accordingly, the attack is defeated before the malicious code, e.g., a CodeRed or Slammer type computer worm, becomes widespread on client network 120.

As discussed above, flow moves from maximum number of updates sent check operation 414 if affirmative or from deliver signature update operation 416 to maximum number of packets/signatures sent check operation 418. In maximum number of packets/signatures sent check operation 418, a determination is made as to whether the maximum number of extracted malicious code packets and/or malicious code signatures have been sent from local analysis center computer system 112 to global analysis center 116. For example, the number of extracted malicious code packets and/or malicious code signatures that have been sent are maintained in a counter and this counter is compared to the maximum number.

If the maximum number of extracted malicious code packets and/or malicious code signatures have been sent from local analysis center computer system 112, flow moves to and exits at exit operation 410 or returns to check operation 404. Conversely, if the maximum number of extracted malicious code packets and/or malicious code signatures have not been sent from local analysis center computer system 112, flow moves to a send malicious code packet/signature operation 420.

By limiting the maximum number of extracted malicious code packets and/or malicious code signatures allowed to be sent from local analysis center computer system 112, flooding of global analysis center 116 with extracted malicious code packets and/or malicious code signatures is prevented.

For example, the maximum number of extracted malicious code packets and/or malicious code signatures allowed to be sent from local analysis center computer system 112 is 3 per day although other maximum numbers are used in other embodiments.

Accordingly, if the maximum number of extracted malicious code packets and/or malicious code signatures has not been sent from local analysis center computer system 112, flow moves to send malicious code packet/signature operation 420. In send malicious code packet/signature operation 420, the extracted malicious code packet received in check operation 404 and/or the malicious code signature received as part of the extracted malicious code packet received in check operation 404 or extracted in extract malicious code signature operation 406 is sent from local analysis center computer system 112 to global analysis center 116. From send malicious code packet/signature operation 420, flow moves to and exits at exit operation 410 or returns to check operation 404.

Accordingly, as discussed above, host computer systems 104 automatically detect malicious code, which is infecting host computer systems 104. Further, host computer systems 104 also automatically generate and send extracted malicious code packets to local analysis center computer system 112.

Local analysis center computer system 112 determines whether an attack is taking place on client network 120 based upon the received extracted malicious code packets. If local analysis center computer system 112 determines that an attack is in fact taking place, local analysis center computer system 112 automatically sends an extracted malicious code packet or malicious code signature of the malicious code undertaking the attack to global analysis center 116.

This extracted malicious code packet or malicious code signature is automatically provided to global analysis center 116, which uses the extracted malicious code packet or malicious code signature to prevent the further spread of the malicious code globally, for example by delivering signature updates to global clients. In accordance with one embodiment, the extracted malicious code packet or malicious code signature is automatically provided, e.g., without human intervention and the associated time delay, to global analysis center 116 immediately upon detecting an attack on client network 120. Accordingly, global analysis center 116 can rapidly take action, e.g., provide attack signature data to other networks, to defeat the attack before the malicious code becomes widespread globally.

Further, the extracted malicious code packet or malicious code signature delivered to global analysis center 116 is meaningful and useful information as compared to a standard confusing log file.

Referring now to FIG. 4, in one embodiment, operations 412, 414, and 416 are optional and are not performed. In accordance with this embodiment, upon a determination that the attack threshold has been exceeded in attack threshold exceeded check operation 408, flow moves directly to check operation 418.

In another embodiment, operations 418 and 420 are optional and not performed. In accordance with this embodiment, upon an affirmative determination in check operation 414 or from operation 416, flow moves directly to and exits at exit operation 410 or returns to check operation 404.

In yet another embodiment, operations 418 and 420 are performed prior to operations 412, 414 and 416.

Figure 5:
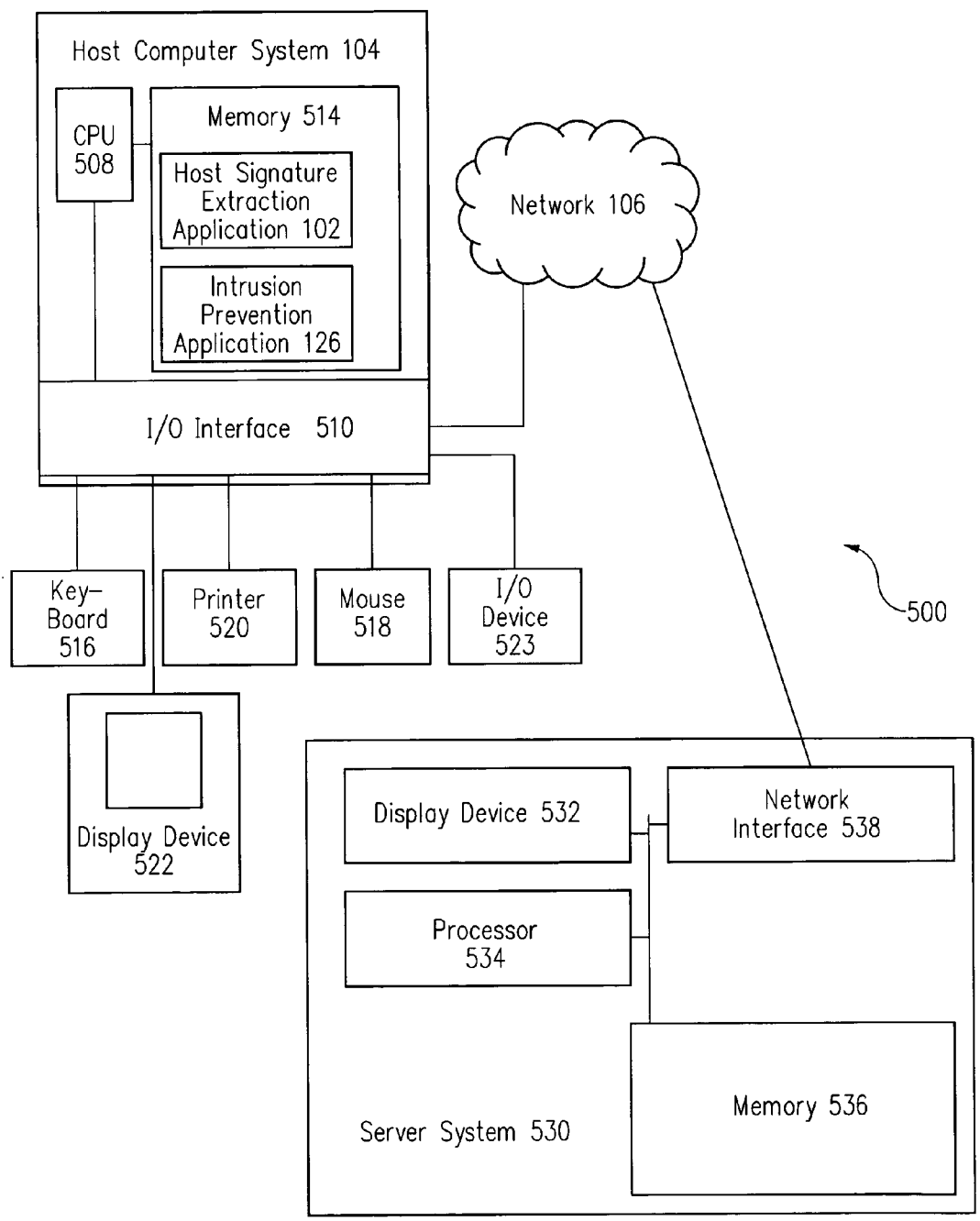
FIG. 5 is a diagram of a client-server system that includes a host signature extraction application executing on a host computer system in accordance with one embodiment of the present invention Common reference numerals are used throughout the drawings and detailed description to indicate like elements.

FIG. 5 is a diagram of a client-server system 500 that includes a host signature extraction application 102 executing on a host computer system 104, e.g., a first computer system, in accordance with one embodiment of the present invention. Referring now to FIGS. 1 and 5 together, host computer system 104 is representative of host computer systems 104 of FIG. 1 in one embodiment. Further, client-server system 500 is part of client network 120 in one embodiment.

Host computer system 104, sometimes called a client or user device, typically includes a central processing unit (CPU) 508, hereinafter processor 508, an input output (I/O) interface 510, and a memory 514. Host computer system 104 may further include standard devices like a keyboard 516, a mouse 518, a printer 520, and a display device 522, as well as, one or more standard input/output (I/O) devices 523, such as a compact disk (CD) or DVD drive, floppy disk drive, or other digital or waveform port for inputting data to and outputting data from host computer system 104. In one embodiment, host signature extraction application 102 is loaded into host computer system 104 via I/O device 523, such as from a CD, DVD or floppy disk containing host signature extraction application 102.

Host computer system 104 is coupled to a server system 530 of client-server system 500 by a network 106. Server system 530 typically includes a display device 532, a processor 534, a memory 536, and a network interface 538.

In one embodiment, local analysis center computer system 112 is similar to host computer system 102 and/or server system 530, for example, includes a central processing unit, an input output (I/O) interface, and a memory. Local analysis center computer system 112 may further include standard devices like a keyboard, a mouse, a printer, a display device and an I/O device(s). The various hardware components of local analysis center computer system 112 are not illustrated to avoid detracting from the principals of the invention.

Network 106 can be any network or network system that is of interest to a user. In various embodiments, network interface 538 and I/O interface 510 include analog modems, digital modems, or a network interface card.

Host signature extraction application 102 and intrusion prevention application 126 are stored in memory 514 of host computer system 104 and executed on host computer system 104. Local analysis center signature extraction application 114 of local analysis center computer system 112 is similarly stored in a memory of local analysis center computer system 112 and executed on local analysis center computer system 112 in one embodiment. The particular type of and configuration of host computer system 104, server system 530, and local analysis center computer system 112 are not essential to this embodiment of the present invention.

Host signature extraction application 102 is in computer memory 514. As used herein, a computer memory refers to a volatile memory, a non-volatile memory, or a combination of the two.

Although host signature extraction application 102 and local analysis center signature extraction application 114 are referred to as applications, this is illustrative only. Host signature extraction application 102 and local analysis center signature extraction application 114 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, host signature extraction application 102 and/or local analysis center signature extraction application 114 is implemented as a system level, e.g., kernel mode driver.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 5, this medium may belong to the computer system itself. However, the medium also may be removed from the computer system. For example, host signature extraction application 102 may be stored in memory 536 that is physically located in a location different from processor 108. Processor 108 should be coupled to the memory 536. This could be accomplished in a client-server system, or alternatively via a connection to another computer via modems and analog lines, or digital interfaces and a digital carrier line.

More specifically, in one embodiment, host computer system 104, local analysis center computer system 112 and/or server system 530 is a portable computer, a workstation, a two-way pager, a cellular telephone, a digital wireless telephone, a personal digital assistant, a server computer, an Internet appliance, or any other device that includes components that can execute the signature extraction functionality in accordance with at least one of the embodiments as described herein. Similarly, in another embodiment, host computer system 104, local analysis center computer system 112 and/or server system 530 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the signature extraction functionality in accordance with one embodiment of present invention can be implemented in a wide variety of computer system configurations. In addition, the signature extraction functionality could be stored as different modules in memories of different devices. For example, signature extraction application 102 could initially be stored in server system 530, and then as necessary, a portion of signature extraction application 102 could be transferred to host computer system 104 and executed on host computer system 104. Consequently, part of the signature extraction functionality would be executed on processor 534 of server system 530, and another part would be executed on processor 108 of host computer system 104. In view of this disclosure, those of skill in the art can implement various embodiments of the present invention in a wide-variety of physical hardware configurations using an operating system and computer programming language of interest to the user.

In yet another embodiment, signature extraction application 102 is stored in memory 536 of server system 530. Signature extraction application 102 is transferred over network 106 to memory 514 in host computer system 104. In this embodiment, network interface 538 and I/O interface 510 would include analog modems, digital modems, or a network interface card. If modems are used, network 106 includes a communications network, and signature extraction application 102 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
    detecting an attack by malicious code on a first computer system;
    extracting a malicious code signature from said malicious code comprising:
        locating a caller's address of said malicious code in a memory of said first computer system; and
        extracting a specific number of bytes backwards from said caller's address;
    creating an extracted malicious code packet including said malicious code signature; and
    sending said extracted malicious code packet from said first computer system to a second computer system.

2. The method of claim 1 wherein prior to said sending, said method further comprising determining that said extracted malicious code packet is a new extracted malicious code packet.

3. The method of claim 1 wherein prior to said sending, said method further comprising determining that a maximum number of extracted malicious code packets have not been sent from said first computer system.

4. The method of claim 1 wherein said extracted malicious code packet is sent from said first computer system to said second computer system on a secure channel.

5. The method of claim 1 wherein the specific number of bytes is 32 bytes.

6. A method comprising:
    detecting an attack by malicious code on a first computer system;
    creating an extracted malicious code packet including parameters associated with said malicious code, said parameters being selected from the group consisting of a caller's address of said malicious code in a memory of said first computer system, a name of a process in which said attack took place, ports connected to said process, service pack levels, operating system information, patch level information, and combinations thereof; and
    sending said extracted malicious code packet from said first computer system to a second computer system.

7. The method of claim 6 wherein prior to said sending, said method further comprising determining, that said extracted malicious code packet is a new extracted malicious code packet.

8. The method of claim 6 wherein prior to said sending, said method further comprising determining that a maximum number of extracted malicious code packets have not been sent from said first computer system.

9. The method of claim 6 wherein said extracted malicious code packet is sent from said first computer system to said second computer system on a secure channel.

10. The method of claim 6 further comprising determining whether said malicious code is sendable.

11. The method of claim 10 wherein upon a determination that said malicious code is sendable, said method further comprising extracting said malicious code from a memory location.

12. The method of claim 11 wherein said extracting comprises copying or cutting said malicious code from said memory location.

13. The method of claim 11 further comprising appending said parameters to said malicious code after said extraction.

14. The method of claim 10 wherein upon a determination that said malicious code is not sendable, said method further comprising extracting a snippet of said malicious code from a memory location.

15. The method of claim 14 wherein said extracting comprises copying or cutting a portion of said malicious code from said memory location.

16. The method of claim 14 further comprising appending said parameters to said snippet after said extraction.

17. The method of claim 14 wherein said extracting a snippet comprises:
locating a caller's address of said malicious code; and
extracting a specific number of bytes above and below said caller's address.

18. The method of claim 17 wherein said extracting a specific number of bytes above and below said caller's address comprises extracting 4 KB above said caller's address and 4 KB below said caller's address.

19. The method of claim 10 wherein said malicious code is sendable if a size of said malicious code is 8 KB or less.

20. A method comprising:
receiving an extracted malicious code packet from a first computer system with a second computer system, said first computer system being a host computer system and said second computer system being a local analysis center computer system; and
determining whether an attack threshold has been exceeded based upon said extracted malicious code packet, wherein upon a determination that an attack threshold has been exceeded, said method further comprising delivering a signature update comprising a malicious code signature to an intrusion detection system.

21. The method of claim 20 further comprising determining that a maximum number of signature updates have not been sent prior to said delivering a signature update.

22. The method of claim 20 further comprising creating said signature update.

23. The method of claim 20 wherein said extracted malicious code packet includes a malicious code signature, and wherein upon a determination that said attack threshold has been exceeded, said method further comprising delivering said malicious code signature to a global analysis center.

24. The method of claim 23 further comprising determining that a maximum number of malicious code signatures have not been sent prior to said delivering said malicious code signature.

25. The method of claim 23 further comprising extracting said malicious code signature from said extracted malicious code packet.

26. The method of claim 20 further comprising determining whether said extracted malicious code packet includes a malicious code signature, wherein upon a determination that said extracted malicious code packet does not include a malicious code signature, said method further comprising extracting a malicious code signature from said extracted malicious code packet.

27. The method of claim 20 wherein upon a determination that said attack threshold has been exceeded, said method further comprising delivering said extracted malicious code packet to a global analysis center.

28. The method of claim 27 further comprising determining that a maximum number of extracted malicious code packets have not been sent prior to said delivering said extracted malicious code packet.

29. A computer system comprising:
a local analysis center signature extraction application for receiving an extracted malicious code packet from a first computer system with a second computer system, said first computer system being a host computer system and said second computer system being a local analysis center computer system; and
said local analysis center signature extraction application further for determining whether an attack threshold has been exceeded based upon said extracted malicious code packet, wherein upon a determination that an attack threshold has been exceeded, said method further comprising delivering a signature update comprising a malicious code signature to an intrusion detection system.

30. A computer system comprising:
an intrusion prevention application for detecting an attack by malicious code on a first computer system;
a host signature extraction application for extracting a malicious code signature from said malicious code comprising:
locating a caller's address of said malicious code in a memory of said first computer system; and
extracting a specific number of bytes backwards from said caller's address;
said host signature extraction application further for creating an extracted malicious code packet including said malicious code signature; and
said host signature extraction application further for sending said extracted malicious code packet from said first computer system to a second computer system.

31. A computer system comprising:
an intrusion prevention application for detecting an attack by malicious code on a first computer system;
a host signature extraction application for creating an extracted malicious code packet including parameters associated with said malicious code, said parameters being selected from the group consisting of a caller's address of said malicious code in a memory of said first computer system, a name of a process in which said attack took place, ports connected to said process, service pack levels, operating system information, patch level information, and combinations thereof; and
said host signature extraction application further for sending said extracted malicious code packet from said first computer system to a second computer system.

* * * * *

UNITED STATES PATENT AND TRADEMARK OFFICE
CERTIFICATE OF CORRECTION

PATENT NO. : 7,392,543 B2  Page 1 of 1
APPLICATION NO. : 10/611472
DATED : June 24, 2008
INVENTOR(S) : Peter Szor It is certified that error appears in the above-identified patent and that said Letters Patent is hereby corrected as shown below:

In Column 18, Claim 7, Line 48, between "determining" and "that", delete ",".

Signed and Sealed this

Second Day of December, 2008

JON W. DUDAS
*Director of the United States Patent and Trademark Office*